(12) United States Patent
Hellmig et al.

(10) Patent No.: US 12,467,497 B2
(45) Date of Patent: Nov. 11, 2025

(54) SPRING HEAD SCREW ASSEMBLY

(71) Applicant: EJOT SE & Co. KG, Bad Berleburg (DE)

(72) Inventors: Ralph Joerg Hellmig, Bad Laasphe (DE); David Korn, Bad Laasphe (DE)

(73) Assignee: EJOT SE & CO. KG, Bad Berleburg (DE)

( * ) Notice: Subject to any disclaimer, the term of this patent is extended or adjusted under 35 U.S.C. 154(b) by 260 days.

(21) Appl. No.: 18/280,191

(22) PCT Filed: Mar. 9, 2022

(86) PCT No.: PCT/EP2022/056073
§ 371 (c)(1),
(2) Date: Sep. 1, 2023

(87) PCT Pub. No.: WO2022/189526
PCT Pub. Date: Sep. 15, 2022

(65) Prior Publication Data
US 2024/0141949 A1  May 2, 2024

(30) Foreign Application Priority Data
Mar. 9, 2021 (DE) ..................... 10 2021 105 698.5

(51) Int. Cl.
*F16B 39/282* (2006.01)
(52) U.S. Cl.
CPC .................................. *F16B 39/282* (2013.01)
(58) Field of Classification Search
CPC .. F16B 35/06; F16B 41/00; F16B 5/02; F16B 39/282; Y10T 403/32532; Y10T 403/75
See application file for complete search history.

(56) References Cited

U.S. PATENT DOCUMENTS

| 3,422,721 A | 1/1969 | Yonkers |
| 3,566,738 A | 3/1971 | Cupit |

(Continued)

FOREIGN PATENT DOCUMENTS

| DE | 6808207 U | 4/1969 |
| DE | 2611395 B1 | 7/1977 |

(Continued)

OTHER PUBLICATIONS

PCT International Search Report mailed Jun. 15, 2022 in counterpart PCT Application No. PCT/EP2022/056073, 2 pages in English.

(Continued)

*Primary Examiner* — Daniel J Wiley
(74) *Attorney, Agent, or Firm* — Juan Carlos A. Marquez; Marquez IP Law Office, PLLC

(57) ABSTRACT

The invention relates to a spring head screw assembly (8) incorporating a spring head screw (10) having a head (12) with a conical skirt (14) that widens towards the free end of a threaded shank which adjoins the head (12), wherein the spring head screw assembly (8) has a washer (30) which is located between the skirt and the threaded part (20) of the shank (16) in an unthreaded part (18) of the shank that has a bolt diameter ($d_0$). The inner surface (22) of the skirt transitions into the shank at a radius ($R_u$), wherein the inner surface (22) forms a contact angle ($\alpha$) with a support plane ($E_A$). The support plane is defined by the end of the skirt facing the free end of the screw and is orthogonal to the screw axis. The shank has, between the support plane and the radius in the transition to the skirt, a cylindrical region having the bolt diameter.

15 Claims, 2 Drawing Sheets

(56) References Cited

U.S. PATENT DOCUMENTS

Figure 1:
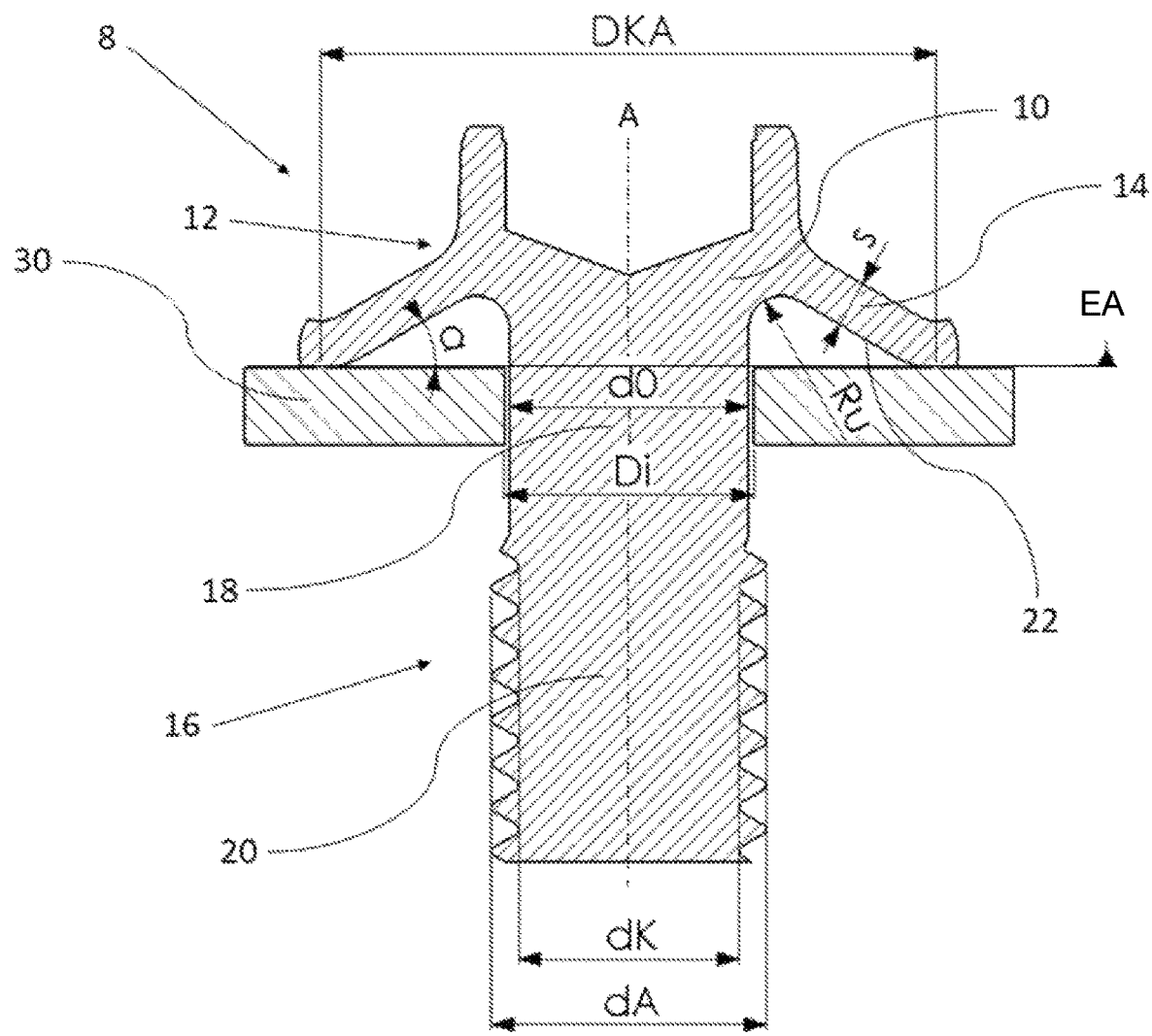

| | | | |
|---|---|---|---|
| 4,373,842 A | 2/1983 | Bettini et al. | |
| 5,209,596 A | 5/1993 | Matczak et al. | |
| 5,333,987 A | 8/1994 | Rives | |
| 10,184,505 B2* | 1/2019 | Drummond | B21K 1/46 |
| 10,309,439 B2* | 6/2019 | Limatoc | B21D 53/00 |
| 10,502,255 B2* | 12/2019 | Yvain | F16B 31/028 |
| 10,941,806 B2* | 3/2021 | Zander | F16B 43/001 |
| 11,111,945 B2* | 9/2021 | Limatoc | F16B 39/284 |
| 11,181,139 B2 | 11/2021 | Hellmig et al. | |
| 2003/0175093 A1 | 9/2003 | Walther | |
| 2005/0281661 A1 | 12/2005 | Kesil et al. | |
| 2010/0068004 A1 | 3/2010 | Mair | |
| 2013/0089389 A1 | 4/2013 | Gong et al. | |
| 2013/0251476 A1* | 9/2013 | Pinzl | F16B 31/00 411/378 |

FOREIGN PATENT DOCUMENTS

| | | |
|---|---|---|
| DE | 3135692 A1 | 5/1982 |
| DE | 102006041860 A1 | 3/2008 |
| DE | 102011056695 A1 | 6/2013 |
| DE | 102016100466 A1 | 7/2017 |
| EP | 0570290 A1 | 11/1993 |

OTHER PUBLICATIONS

PCT International Search Report and Written Opinion mailed Jun. 15, 2022 in counterpart PCT Application No. PCT/EP2022/056073, 12 pages in German.

German Search Report mailed Oct. 27, 2021 in counterpart German application DE10 2021 105 698.5, 6 pages in German'.

PCT International Preliminary Report on Patentability and Written Opinion dated Sep. 12, 2023 issued in counterpart PCT Application No. PCT/EP2022/056073, 5 pages in English.

* cited by examiner

SPRING HEAD SCREW ASSEMBLY

This application claims priority to PCT Application No. PCT/EP2022/056073 filed on Mar. 9, 2022. The disclosure of the above application is incorporated herein by reference in its entirety.

The invention relates to a spring head screw assembly as specified in the preamble of claim 1.

In the prior art, in DE 10 2016 100 446 A1 for example, spring head screws are known having a conical skirt in the manner of a disc spring that extends from the screw head, which skirt widens towards the free end of the spring head screw. The inner surface of the conical skirt transitions into a threaded shank at a radius. The end of the skirt facing the free end of the screw has a contact area which in particular forms a support plane that is in particular orthogonal to the screw axis. The inner surface of the conical skirt forms a contact angle $\alpha$ with the support plane.

Screws of this type are used to fasten clamping parts to substructures whose components undergo a reduction in thickness over time, in which situation the spring head serves to maintain the preload.

Particularly when exposed to a change in temperature, some materials undergo significant creep deformation under the preload force applied in each case.

A shortcoming of known prior art designs is the risk of bad screw joints in which a washer gets caught on the screw. When it is then exposed to temperatures of, for example, above between 80° C. and approx. 160° C. for a prolonged period in the screwed-in state, the preload force will decrease over time to such an extent that it is below a permissible minimum value.

The invention is based, among other things, on the insight that creep deformation occurs in particular in a high contact pressure area of the clamping part.

It is the object of the invention to provide a spring head screw assembly which exhibits improved retention of the preload force when exposed to higher temperatures, and to achieve higher assembly safety.

This object is accomplished by the characterizing features of claim 1 in conjunction with the features of its preamble.

The dependent claims relate to advantageous further embodiments of the invention.

In a known manner, a spring head screw assembly comprises a spring head screw having a conical skirt that extends from the head in the manner of a disc spring, which skirts widens towards the free end of the spring head screw. The inner surface of the conical skirt transitions into a threaded shank at a radius. At its end facing the free end of the screw, the skirt has a contact area which in particular forms a support plane that is in particular orthogonal to the screw axis. The inner surface of the conical skirt forms a contact angle $\alpha$ with the support plane.

The invention provides for a washer to be arranged between the threaded part of the shank and the skirt of the spring head screw and through which the shank passes. As a result, the washer is located between the retained component and the skirt in the assembled state.

The washer acts to reduce the contact pressure exerted on the component by the skirt. This allows the magnitude of the creep deformation of the clamped part to be reduced for the same preload force.

The washer is held in place, preferably in a captive manner, on an unthreaded part of the shank, which unthreaded part of the shank is located between the head and a threaded part of the shank and has a bolt diameter. The inner diameter of the washer is preferably between the outer diameter of the screw thread and the bolt diameter.

The inventive screw is designed in such a way that the shank has, between the support plane and the radius in the area in the transition to the skirt, a cylindrical region having a diameter which is in particular equal to the bolt diameter.

The washer surface facing the screw head will be in the support plane when the washer only just touches the skirt.

The presence of the cylindrical region between the support plane and the shank transition may reduce the likelihood of the shank transition between shank and skirt, which has a radius, coming to bear against the washer as the spring head screw is being screwed in even though the desired preload of the skirt has not yet been reached, which may then result in a process-limiting increase in the screw-in torque.

According to the invention, the cylindrical region between the support plane and the shank transition thus allows the screw to be tightened over a larger screw-in angle without the shank transition coming to bear against the washer. This makes for a more reliable exploitation of the elastic spring travel of the skirt.

In this way, an only very slightly larger inner diameter of the washer compared to the shank diameter, as required for a rolled-on captive washer, can be achieved, for example, without negatively affecting the screw-in angle. For a washer inner diameter with a generous tolerance compared to the shank diameter, this also significantly reduces the likelihood of a blockage occurring between the shank transition and the washer in case of an eccentric position of the washer.

The inventive measure allows the spring area of the head of the spring head screw to be increased, which then results in improved retention of the preload force when exposed to higher temperatures.

Preferably, the transition from the radius to the shank and the skirt may be tangential. This has the advantage of achieving homogeneous stress distribution in the skirt as well as a reduced notch effect, for higher dynamic safety.

In the support plane, the skirt forms an annular surface with a support inner diameter $D_{KA}$. The unthreaded part of the shank has the bolt diameter $d_0$.

In another preferred embodiment of the invention, the radius at the transition from the shank to the inner surface of the skirt may be less than tan $(\alpha)$*factor*(DKA−d0)/2, which factor is less than 0.5 and is preferably between 0.2 and 0.4.

The radius in the shank transition therefore satisfies the following formula:

$$R_U < \tan(\alpha)*\text{factor}*(D_{KA}-d_0)/2 | \text{factor} < 0.5$$

Preferably, the washer inner diameter is less than 1.07 times the shank diameter in the unthreaded part between the head and the threaded part of the shank.

In yet another preferred embodiment, the contact angle $\alpha$ is between 20° and 40°, in particular between 28° and 32°. This results in the advantage that, at the desired preload force, a sufficient rotation angle window is available for assembly.

In another advantageous embodiment, the thickness of the skirt is between approx. 5% and 15% of the support inner diameter. The thickness of the skirt can be used to adjust the range of the preload force that can be generated.

In another aspect of the invention, a method for automatically fitting an inventive spring head screw is provided. According to this method, the spring head screw is tightened until a predefined torque is reached, and once the torque is detected, the spring head screw is screwed in further over a predefined rotation angle.

The predefined angle is at least 180°, and the predefined torque is preferably above a screw-in torque defined for the respective application and below a torque that needs to be applied to achieve a plastic deformation of the skirt.

The plastic deformation region can be easily determined for each application, since in the incipient plastic deformation region, the increase of torque levels off noticeably and the screw-in angle torque graph plateaus until complete plastic deformation of the skirt, and the torque increases steeply again as the screw-in angle increases.

The predefined torque is preferably in the middle between the torque required for plastic deformation and the screw-in torque defined for the respective application.

In the method for fitting a spring head screw of the type described above, the spring head screw is used for joining a clamping part to be mounted, which is made of a material that undergoes significant creep deformation when subjected to the respective preload force and when exposed to corresponding temperatures, with a substructure into which the spring head screw is fitted.

In yet another aspect of the invention, the invention relates to such a component connection comprising a spring head screw assembly as described above comprising a spring head screw and a washer, a substructure into which the spring head screw is screwed, with a clamping part being located between the washer and the substructure which clamping part is held in place under preload between the washer and the lower component layer.

The fact that the edge area of the skirt comes to bear against the washer considerably reduces local stress transfer through the skirt to the clamping part, which significantly reduces creep of the clamping part material and thus creep deformation of the clamping part.

Even when the component connection is used in a temperature range permissible for the intended use of the component connection, clamping part thickness will still be reduced due to creep deformation by a maximum creep distance under the preload applied by the spring head.

Accordingly, the spring head screw assembly, in particular the spring head screw, is dimensioned such that the spring travel stored in the elastic deformation of the spring head and the elongation of the screw stored in the elongation of the shank result in a total travel that is greater than the maximum creep distance in the permissible temperature range.

This leaves a stored spring travel which allows a preload to be reliably applied to the clamping part even if the part creeps. Thus, for the same preload and screw diameter, the total travel exceeds the elongation of a conventional screw shank.

Preferably, the difference between the total travel and the maximum creep distance over a given time corresponds to a spring travel at which a minimum preload is applied to the component. This is achieved by appropriately dimensioning the washer and the skirt.

The minimum preload is predefined in relation to the specific application and component connection.

The spring head screw and the washer are each made of a steel, for example, with the clamping part preferably being a copper part.

The spring head screw assembly is for example used to connect a clamping part, which provides a releasable electrical contact, with a second component of said electrical contact. Maintaining the preload thus also allows reliable contacting to be provided over a wide temperature range. The second component may be constituted by the substructure or another clamping part.

The proposed method in combination with the inventive spring head screw assembly allows an inventive component connection to be reliably obtained with excellent retention of the preload force under the influence of temperature.

Additional advantages, features and possible applications of the present invention will be apparent from the description which follows, in which reference is made to the embodiments illustrated in the drawings.

Figure 2:
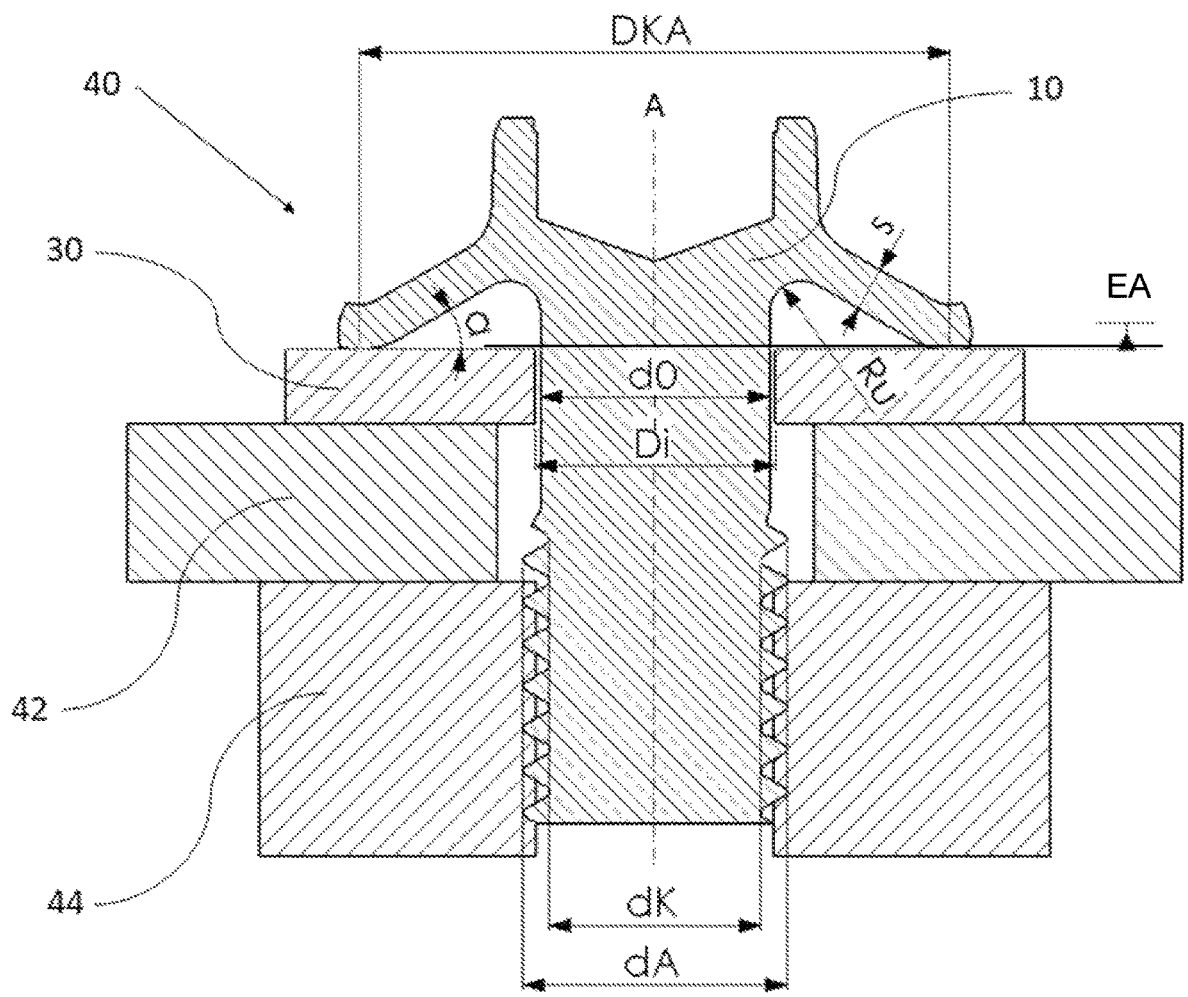

In the drawings,

FIG. 1 is a sectional view of a spring head screw assembly according to the invention, and FIG. 2 is a component connection according to the invention consisting of a spring head screw assembly, a clamping part and a substructure.

FIG. 1 is a view of an inventive spring head screw assembly 8 comprising a spring head screw 10 with a head 12 having a skirt 14 that extends conically in the manner of a disc spring. The skirt 14 forms a support plane $E_A$ that faces the free end of the spring head screw 10 and is substantially orthogonal to the screw axis A.

The conical skirt 14 forms an inner diameter in the support plane $E_A$, which diameter is designated as the support inner diameter $D_{KA}$.

The spring head screw 10 also includes a shank 16 having, at its end facing the head 12, an unthreaded part 18 of a diameter that is referred to as the bolt diameter $d_0$. In the direction of the free end of the screw 10, which is opposite the head 12, the shank 16 has a threaded part 20 with an outer diameter $d_A$ that is larger than the bolt diameter $d_0$, and with a core diameter $d_K$ that is typically smaller than the bolt diameter $d_0$.

The inventive spring head screw assembly 8 further comprises a captive washer 30 that has been rolled onto the shank 16 of the spring head screw 10. The washer 30 thus has an inner diameter $D_I$ that is less than the outer diameter $d_A$ of the threaded part 20 of the shank 16, but larger than the bolt diameter $d_0$.

In the inventive spring head screw 10, the unthreaded part 18 of the shank 16 transitions into the skirt 14 at a radius $R_U$, with another unthreaded part 18 of the shank 16 being provided between the support plane $E_A$ and the radius $R_U$, which part has the bolt diameter $d_0$.

This has the advantage that, with the spring head screw 10, in the tightening process, during which the center of gravity of the head moves towards the washer 30 due to the spring travel of the skirt 14, the washer 30 is prevented from coming to bear against the widening shank transition in the transition from the shank 16 to the skirt 14 over a cylindrical region that is longer in the axial direction. This increases the range in which the spring head screw 10 can be used with the washer 30 in the elastic region.

In the present design, the contact angle α, which represents the angle between the inner surface 22 of the skirt 14 and the support plane $E_A$, is 30°.

The radius $R_U$ for the contour of the underside of the head is given by $(D_{KA}-d_0)/2*\tan(\alpha=30°)*$factor, with the factor being approx. 0.3 in the present example.

The radius $R_U$ transitions tangentially into both the shank 16 and the skirt 14.

This ensures that axial displacement of the center of gravity of the head 12 in the screwing-in direction will not prematurely cause the transition from shank to head to come to bear against the washer 30, which would result in a process-limiting torque increase.

This allows to take better account of creep, in particular of the clamping part, under preload and also makes for improved retention of the preload force.

FIG. 2 is a view of a component connection 40 comprising an inventive spring head screw 10 with a washer 30, and a substructure 44 into which the spring head screw 10 is screwed, with a clamping part 42 being clamped between the washer 30 and the substructure 44, with the skirt 14 of the spring head screw 10 exerting a preload force on the clamping part 42. In the present example, the clamping part 42 has a higher creep behavior under the influence of temperature than the substructure 44. It is also possible to clamp a multitude of clamping parts between the washer 30 and the substructure 44.

In the design of the component connection 40, the components are matched to one another in such a way that, under the intended conditions of use, namely preload, temperature profile and time, the spring head screw compensates for creep of the clamping part to such an extent that there is still some spring travel. The spring head screw thus applies a minimum preload force to the clamping part 42.

For example, the clamping part 42 makes electrical contact with the substructure 44.

The spring head screw 10 and the washer 30 are each made of steel, for example, and the clamping part 42 is made of copper.

The washer 30 is retained on the spring head screw 10 in a captive manner, which makes for easy mounting thereof.

The invention claimed is:

1. A spring head screw assembly comprising a spring head screw having a head with a conical skirt that widens towards a free end of a threaded shank which adjoins the head, wherein the spring head screw assembly has a washer which is located between the skirt and a threaded part of the shank in an unthreaded part of the shank that has a bolt diameter ($d_0$), with an inner surface of the skirt transitioning into the shank at a radius ($R_U$), which inner surface forms a contact angle ($\alpha$) with a support plane ($E_A$), which support plane ($E_A$) is defined by the end of the skirt facing a free end of the screw and is orthogonal to a screw axis, wherein the shank has, between the support plane ($E_A$) and the radius ($R_U$) in the transition to the skirt, a cylindrical region having the bolt diameter ($d_0$).

2. A spring head screw assembly according to claim 1, wherein said washer has a hole with an inner diameter ($D_1$) that is less than an outer diameter ($d_A$) of the adjoining threaded part of the shank.

3. A spring head screw assembly according to claim 1, wherein said radius ($R_U$) transitions tangentially into the shank.

4. A spring head screw assembly according to claim 3, wherein said radius ($R_U$) transitions tangentially into the inner surface of the skirt.

5. A spring head screw assembly according to claim 1, wherein, in the support plane ($E_A$), said skirt defines a support inner diameter ($D_A$), with said radius ($R_U$) being less than ($D_{KA}-d_0$)/2*tan($\alpha$)*factor, which factor is less than 0.5.

6. A spring head screw assembly according to claim 1, wherein said factor is between 0.2 and 0.4.

7. A spring head screw assembly according to claim 1, wherein said inner diameter ($D_1$) of the washer is less than 1.07 times the bolt diameter ($d_0$).

8. A spring head screw assembly according claim 1, wherein said angle ($\alpha$) is between 20° and 40°, in particular between 28° and 32°.

9. A spring head screw assembly according to claim 1, wherein the thickness(s) of said skirt is between approx. 5% and 15% of the support inner diameter ($D_A$) of the head.

10. A spring head screw assembly according to claim 1, wherein said washer is mounted on the spring head screw in a captive manner.

11. A method for automatically fitting a spring head screw assembly said spring head screw assembly comprising a spring head screw having a head with a conical skirt that widens towards a free end of a threaded shank which adjoins the head, wherein the spring head screw assembly has a washer which is located between the skirt and a threaded part of the shank in an unthreaded part of the shank that has a bolt diameter ($d_0$), with an inner surface of the skirt transitioning into the shank at a radius ($R_U$), which inner surface forms a contact angle ($\alpha$) with a support plane ($E_A$), which support plane ($E_A$) is defined by the end of the skirt facing a free end of the screw and is orthogonal to a screw axis, wherein the shank has, between the support plane ($E_A$) and the radius ($R_U$) in the transition to the skirt, a cylindrical region having the bolt diameter ($d_0$), and wherein said spring head screw is inserted through a clamping part and is fastened to a substructure located under the clamping part, which spring head screw is tightened until a predefined torque is reached, and once said torque is detected, the spring head screw is screwed in further over a predefined angle of rotation.

12. A method according to claim 11, wherein said predefined angle of rotation is at least 180°.

13. A component connection comprising a spring head screw assembly that comprises a spring head screw having a head with a conical skirt that widens towards a free end of a threaded shank which adjoins the head, wherein the spring head screw assembly has a washer which is located between the skirt and a threaded part of the shank in an unthreaded part of the shank that has a bolt diameter ($d_0$), with an inner surface of the skirt transitioning into the shank at a radius ($R_U$), which inner surface forms a contact angle ($\alpha$) with a support plane ($E_A$), which support plane ($E_A$) is defined by the end of the skirt facing a free end of the screw and is orthogonal to a screw axis, wherein the shank has, between the support plane ($E_A$) and the radius ($R_U$) in the transition to the skirt, a cylindrical region having the bolt diameter ($d_0$); and a substructure into which the spring head screw is screwed, with a clamping part being clamped in place between the spring head assembly and the substructure, which clamping part, when exposed to a predefined temperature and subjected to a predefined contact pressure, undergoes a reduction in thickness in a region of a bearing surface of the washer by a creep distance, said spring head screw assembly being configured such that when the screw has been tightened, the sum of an elongation of the shank and a spring travel of the skirt will exceed the length of the creep distance.

14. A component connection according to claim 13, made according to a method comprising inserting said spring head screw through a clamping part and fastening to a substructure located under the clamping part, tightening said spring head screw until a predefined torque is reached, and once said torque is detected, screwing the spring head screw in further over a predefined angle of rotation.

15. A component connection according to claim 13, wherein said spring head screw assembly is made of steel and said clamping part is made of copper.

* * * * *